(12) United States Patent
Epsinosa Sanchez et al.

(10) Patent No.: US 9,731,835 B2
(45) Date of Patent: Aug. 15, 2017

(54) AERIAL REFUELING COUPLING FOR IN-FLIGHT OPERATION PARAMETER MEASURING

(71) Applicant: EADS Construcciones Aeronáuticas, S.A., Madrid (ES)

(72) Inventors: Martín Epsinosa Sanchez, Getafe (ES); Jorge Terrón Blanco, Getafe (ES)

(73) Assignee: EADS Construcciones Aeronáuticas, S.A., Madrid (ES)

( * ) Notice: Subject to any disclaimer, the term of this patent is extended or adjusted under 35 U.S.C. 154(b) by 135 days.

(21) Appl. No.: 14/728,644

(22) Filed: Jun. 2, 2015

(65) Prior Publication Data

US 2015/0344147 A1      Dec. 3, 2015

(30) Foreign Application Priority Data

Jun. 3, 2014 (EP) .................................... 14382213

(51) Int. Cl.
*B64D 39/00* (2006.01)
*B64D 39/06* (2006.01)

(52) U.S. Cl.
CPC ............. *B64D 39/06* (2013.01); *B64D 39/00* (2013.01)

(58) Field of Classification Search
CPC ............................... B64D 39/00; B64D 41/007
USPC ...................................................... 244/135 A
See application file for complete search history.

(56) References Cited

U.S. PATENT DOCUMENTS

| 6,375,123 B1 | 4/2002 | Greenhalgh et al. |
| 6,604,711 B1 | 8/2003 | Stevens et al. |
| 6,994,294 B2 * | 2/2006 | Saggio, III ............. B64D 39/04 141/382 |
| 7,137,598 B2 * | 11/2006 | Von Thal ............... B64D 39/00 244/135 A |
| 7,819,361 B2 * | 10/2010 | Saggio, III ............. B64D 39/00 244/1 TD |

(Continued)

FOREIGN PATENT DOCUMENTS

| EP | 1 736 407 A1 | 12/2006 |
| EP | 2 474 475 A2 | 7/2012 |
| EP | 2 607 237 A1 | 6/2013 |

OTHER PUBLICATIONS

European Search Report for Application No. EP 14 38 2213 dated Nov. 7, 2014.

*Primary Examiner* — Brian M O'Hara
*Assistant Examiner* — Keith L Dixon
(74) *Attorney, Agent, or Firm* — Jenkins, Wilson, Taylor & Hunt, P.A.

(57) ABSTRACT

The present disclosure refers an aerial refueling coupling for in-flight parameter measuring, including a body configured to receive and support a probe and a removable shell that covers at least part of the body. The aerial refueling coupling includes a sensor system for detecting at least one parameter related to in-flight refueling operation, a data processing device configured to provide a measure at least relative to parameters detected by the sensor system, a portable storage system, and a power supply system comprising at least on battery for supplying energy, and a ram air turbine for their activation when the aerial refueling coupling is in-flight. The data processing device, the storage system and the power supply system are mounted onto the body covered by the shell.

12 Claims, 2 Drawing Sheets

(56) References Cited

U.S. PATENT DOCUMENTS

| | | | |
|---|---|---|---|
| 8,561,947 B2* | 10/2013 | Feldmann | B64D 39/04 244/1 TD |
| 8,790,079 B2* | 7/2014 | Tersmette | B64D 39/00 415/218.1 |
| 2013/0020441 A1* | 1/2013 | Peake | B64D 39/06 244/135 A |
| 2015/0083864 A1* | 3/2015 | Black | B64D 39/00 244/135 A |

* cited by examiner

AERIAL REFUELING COUPLING FOR IN-FLIGHT OPERATION PARAMETER MEASURING

CROSS-REFERENCE TO RELATED APPLICATION

This application claims the benefit of and priority to European patent application No. 14 382213.8 filed on Jun. 3, 2014, the entire disclosure of which is incorporated by reference herein.

DESCRIPTION

Technical Field

The present disclosure refers to an aerial refueling coupling for measuring parameters related to the in-flight refueling operation, and more specifically, for acquiring and recording all relevant physical and operational parameters regarding to the functionality of the aerial refueling coupling.

An object of the disclosure herein is to provide an aerial refueling coupling for in-flight measuring and monitoring that provides an accurate and reliable operational and functional parameter measures during the in-flight refueling process.

Another object of the present disclosure is to provide an aerial refueling coupling suitable for collecting the information required for evaluating and issuing the tanker-receiver pairs qualification, and also for developing and certifying hose-and-drogue aerial refueling systems.

BACKGROUND

Aerial refueling allows extending the flight range of those aircrafts that have been specifically equipped for carrying it out. The in-flight refueling process involves the transfer of fuel from a tanker aircraft to another aircraft to be refueled, the receiver aircraft.

Currently, one of the most used refueling system type is hose-and-drogue system. The hose-and-drogue system requires of a flexible hose having an end attached to a drogue in the tanker aircraft, and a probe to be engaged in the receiver aircraft. The drogue is a funnel shaped device provided with an aerial refueling coupling, usually fitted with vanes and a canopy at its free end to stabilize its flight, once the hose has been deployed from the tanker aircraft for the refueling.

The aerial refueling coupling has some different functions such as to stabilize the hose movements, to adequate the fuel pressure within acceptable values and/or to ensure the proper latching of the probe of the receiver aircraft.

Regarding these functions, U.S. Pat. No. 7,137,598 B2 describes the use of a system and method that stabilizes hose movements since detecting slack or impeding oscillations in a portion of the elongate hose. Then, the disclosure herein prevents potentially dangerous changes in disposition that may occur in probe and drogue in-flight refueling system components, such as an elongate hose trailing aft and below a first aircraft. For that, the disclosure herein generates a signal to be transmitted to the retracting device, carried by the tanker aircraft, and responsible for extending and retracting the hose. However, the disclosure herein focuses only on the tanker aircraft, and particularly, on the hose behavior.

It is also known by U.S. Pat. No. 6,375,123 B1 a refueling drogue for rearward deployment from a tanker aircraft into an air stream that includes a fuel valve for receiving fuel from the tanker aircraft and controlling a flow of the fuel and a coupling attached to the fuel valve for receiving fuel from the fuel valve. Again, the disclosure herein focuses only on the tanker and does not provide any measures that allow analyzing and controlling and drogue refueling functionality.

Also, the document EP 2607237 A1 describes a latching detection and indication system for in-flight refueling operations, wherein the aerial refueling coupling and the probe comprises cooperating latching means that detect one positioning state between three possible states, a non-latched state, an intermediate latching state and a latched state. The system informs the pilot of the receiver aircraft and/or the crew of the tanker aircraft if a proper latching has taken placed to take the required corrective actions that lead to achieve a proper connection. However, the system does not stores the generated information that enables issuing a tanker-receiver pair qualification, or/and a hose-and-drogue certification.

Therefore, it has been detected the need in the aeronautical industry, of a new aerial refueling coupling which is capable of performing on board physical and operational parameter measuring and recording, to provide complete and reliable measures during the in-flight refueling operation. Likewise, it has been detected a need of an aerial refueling coupling that allows providing all data information required for tanker-receiver pairs qualifications and hose-and-drogue certifications.

SUMMARY

The present disclosure overcomes the above mentioned drawbacks by providing an aerial refueling coupling for in-flight operational and functional parameter measuring in hose-and-drogue refueling system. The disclosure herein achieves to provide accurate and reliable measures related to the in-flight refueling operation, and provides storage for storing of all the information gathered aboard the aerial refueling coupling. This way, the disclosure herein provides the information required for tanker-receiver pair qualification, and hose-and-drogue development and certifications, which currently suffers lack of this information.

An aspect of the disclosure herein refers to an aerial refueling coupling for in-flight operational and functional parameter measuring that comprises a body, configured to receive and support a probe, and fixed to a removable shell that covers at least part of the body, wherein the aerial refueling coupling further comprises a sensor system, a data processing device, a portable storage system and a power supply system. In the aerial refueling coupling of the disclosure herein, the data processing device, the storage system and the power supply system are mounted onto the body covered by the shell. The sensor system is suitable for detecting at least one parameter related to the in-flight refueling operation. The data processing device is configured to provide a measure relative to the at least one parameter detected by the sensor system. The storage system is portable and is in communication with the data processing device for storing parameter measurements. The power supply system comprises at least one battery for supplying energy to the data processing device and to the sensor and storage systems, and a ram air turbine (RAT) to activate them when the aerial refueling coupling is in-flight.

Due to the mounting and packaging of the data processing device, and the storage and the power supply systems onto the rigid body of the aerial refueling coupling, the aerial refueling coupling of the disclosure herein provides a secure and durable fitting for the mentioned elements. Besides, placing them in a part of the body that is covered by the shell, a further protection is achieved. This emplacement ensures that the elements are able to endure the ambient conditions they will undergo. Thus, the aerial refueling coupling of the disclosure herein offers a robust and durable solution for the in-flight parameter measuring.

The data processing device is configured to provide a measure at least relative to the parameters detected by the sensor system. In the case in which the data processing device receives information from the sensor system, both function as a data acquisition system to enable the storage of the measure information. Likewise, the data processing device may receive raw information from other sources, for instance, from the ram air turbine, to also perform functions of data acquisition system, synchronizing and allow the storage of data information.

All the information processed by the data processing device is recorded in the portable storage system. The storage system gathers all the information together in a portable format for allowing a data post-processing out of the aerial refueling coupling. This external post-processing enables performing all the analysis required for qualifying the pairs formed by tanker and receiver aircrafts, and also for developing and certifying the hose-and-drogue aerial refueling systems. This way, the disclosure herein solves a limitation of conventional aerial refueling couplings, which currently suffer a lack of instrumentation data during flight tests, preventing them from having this information.

Additionally, placing the elements required for the in-flight parameter measuring in the proper aerial refueling coupling, allows the disclosure herein to provide accurate and reliable information. Besides, the disclosure herein offers a complete collection of data, since the information is collected during the whole in-flight refueling operation. In terms of the present disclosure, the whole in-flight refueling operation starts once the tanker aircraft deploys the hose until the hose is retracted and stored again in the tanker aircraft. An embedded hardware/software logical ensures the data acquisition during such an operation.

In addition, providing a power supply system to the aerial refueling coupling, allows the aerial refueling coupling of the disclosure herein to ensure the functioning of the data processing device and the storage and sensor systems, and in consequence, that the gathering of information is performed. For that, the power supply system comprises at least one special battery for operations in the required environments and control logical based on the RAT inputs to activate them when the aerial refueling coupling is in-flight and to deactivate them when the RAT stops generating electrical pulses, saving energy. This way, an autonomous aerial refueling coupling is provided, since it does not depend on external power sources. Likewise, the aerial refueling coupling is a self-contained energy device, since the special batteries provide the power required for feeding the mentioned elements. Thus, the disclosure herein avoids the need of establishing communication with external equipment, either of the tanker aircraft or the receiver aircraft, to send them the information about detections and measures.

BRIEF DESCRIPTION OF THE DRAWINGS

For a better comprehension of the disclosure herein, the following drawings are provided for illustrative and non-limiting purposes, wherein.

DETAILED DESCRIPTION

Figure 1:
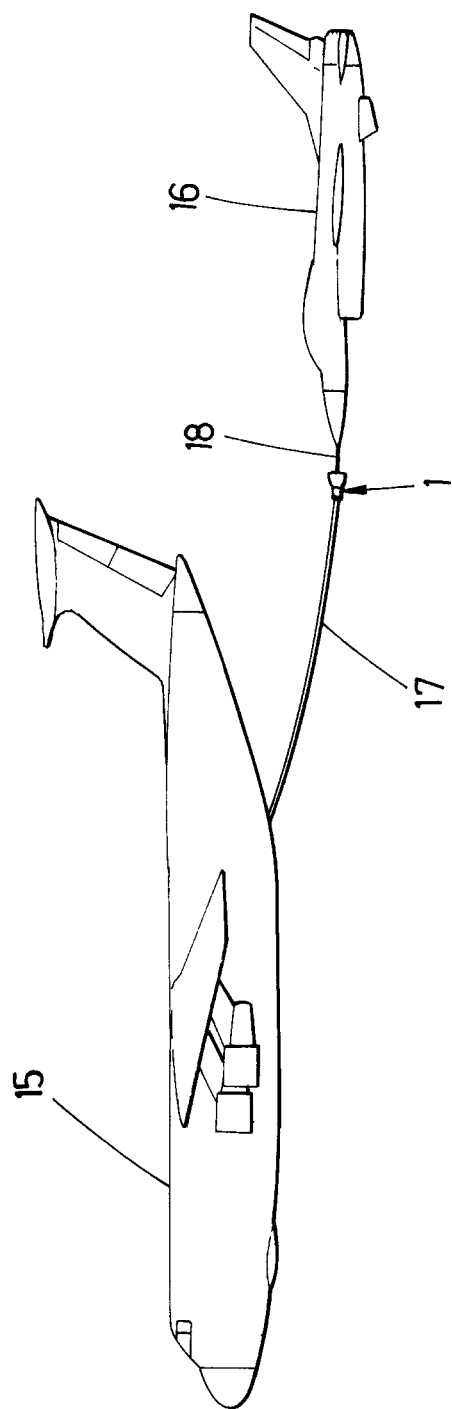
FIG. 1 shows a schematic view of a refueling operation between a tanker aircraft and a receiver aircraft using a hose-and-drogue system.

FIG. 1 shows an in-flight refueling operation based on the use of a hose-and-drogue system. The in-flight refueling involves a tanker aircraft 15 and a receiver aircraft 16, wherein both are provisioned for the refueling operation. The tanker aircraft 15 is provided with a flexible hose 18 ended in a drogue. The drogue comprises an aerial refueling coupling 1 that is specially constituted for the operation. The receiver aircraft 16 is provided with a probe 18, which is a rigid arm placed on the receiver aircraft's nose or fuselage. The aerial refueling coupling 1 is configured for receiving and supporting the probe 18, and also for controlling the pass of fuel once the probe 18 is coupled. When the aerial refueling coupling 1 and the probe 18 are coupled, the valve that carries the probe 18 at its forward end opens, and the fuel passes from the tanker aircraft 15 to the receiver aircraft 16.

Figure 2:
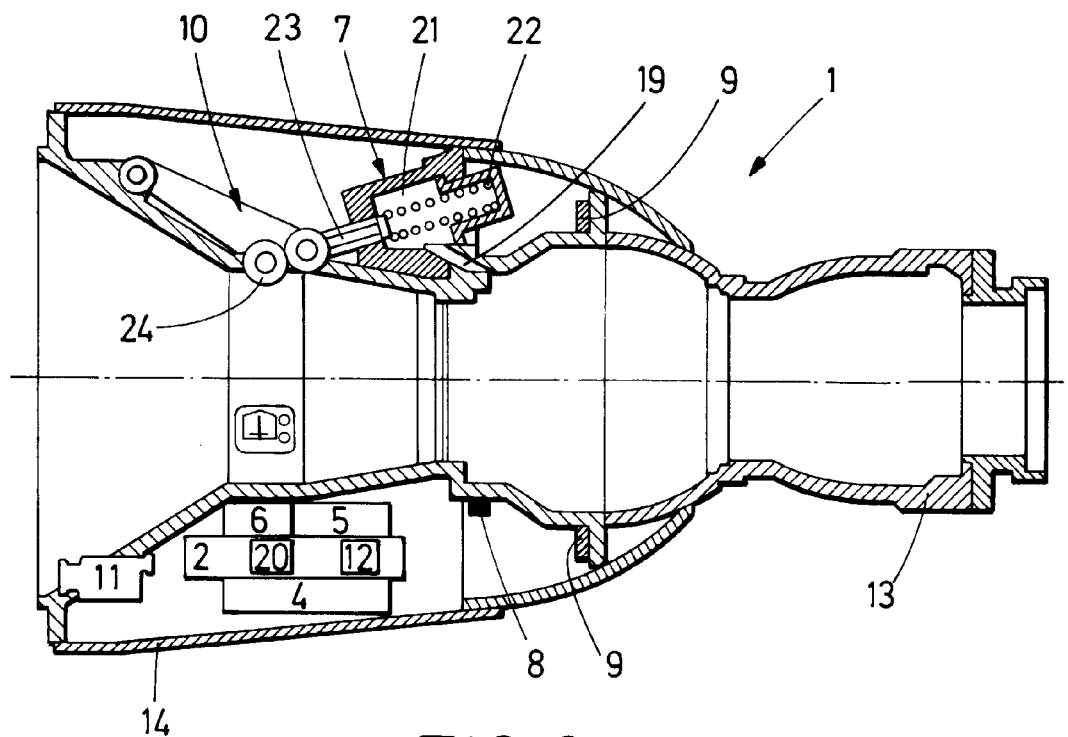
FIG. 2 shows a schematic cross section view of the aerial refueling coupling that indicates the preferred emplacements of most of the elements that form the sensor system. Also, the figure shows the data processing device, the storage system and power supply system preferred emplacements, according to an embodiment of the disclosure herein.

The aerial refueling coupling 1 depicted in FIG. 2 shows the rigid body 13 configured to support and receive a probe 18 by its outwards conical end, opposite to its connection with the hose (not shown). After the ring-shaped coupling, to which the hose (not shown) is assembled, and the partial cylindrical section, the removable shell 14 is fixed to the body 13, covering at least part of it. The shell 14 has a conical-shaped and extends around the cone or bell-shaped portion of the aerial refueling coupling 1.

The data processing device 4, the storage system 5 and the power supply system 2 are mounted onto the body 13 covered by the shell 14. In this emplacement, the shell 14 allows covering and protecting the mentioned elements, at the same time that the elements can be securely attached to the rigid body 13. Besides, the emplacement avoids the need of modifying conventional aerial refueling couplings for their colocation.

The sensor system of the disclosure herein is suitable for detecting at least one parameter related to the in-flight refueling operation, and its emplacement depends on the parameter to be detected. This enables a quick, accurate, and reliable detection.

As known, conventional aerial refueling couplings comprise three latch levers configured to engage a probe and latched it to prevent the probe from disengaging during the refueling. This way, a latching force is applied to latch the probe and the aerial refueling coupling together with a desired resistance, at least resistant to support the fuel pressure, and conveniently variable by adjustment to adequate it to particular cases. According to this, in a preferred embodiment of the disclosure herein, the sensor system comprises at least one potentiometer 10 positioned at each latch lever so as to detect the displacement of the latch levers. Thereby, the sensor system detects exact positions, rather than latching states (non-latched state, intermediate latching state and a latched state), as currently known by the state of the art.

Also, conventional aerial refueling couplings comprise a ball joint to allow rotatable movement of the aerial refueling coupling, when the aerial refueling coupling is coupled to a probe for the in-flight refueling. According to another preferred embodiment, the sensor system comprises gauged screws 9 that fix the ball joint to detect the axial force exerted by the aerial refueling coupling 1 during the in-flight refueling to compensate the drag of the probe 18 when it is coupled with the aerial refueling coupling 1.

Also, conventional aerial refueling couplings comprise three circumferentially spaced latching pistons 21. The fuel pressure within the coupling is admitted to the latching pistons 21, through respective ports 19, to assist springs 22 in the pistons 21 in urging the toggle links 23 outwardly of the pistons 21 so as to flex the toggle link 23 and urge the rollers 24 into a groove of the probe. At this point, the latching force should be applied to latch the probe and the aerial refueling coupling together.

Conventionally, one of the three latching pistons 21 comprises a port for ground testing purposes. According to this, in another preferred embodiment, the sensor system comprises a pressure sensor 7 positioned on a port of one of the three latching pistons 21 to detect fuel output pressure during the in-flight refueling. Preferentially, the pressure sensor 7 shall be suitable for detecting fuel pressure surges.

Additionally, according to another preferred embodiment, the sensor system comprises 3D accelerometers and gyroscopes 8 for detecting data of acceleration and positioning of the aerial refueling coupling 1.

According to another preferred embodiment, the aerial refueling coupling 1 further comprises a video camera 11 positioned, as shown in FIG. 2, at the outwards end of the aerial refueling coupling 1 to record the in-flight refueling. The camera 11 is in communication with the storage system 5 to store the recording.

Preferentially, the data processing device 4 is configured to provide a measure relative to the approach speed (closure rate) of a probe 18 before entering the aerial refueling coupling 1 for the in-flight refueling. The data processing device will be able to obtain this measure from the recording provided by the video camera 11. Alternatively, the receiver closure rate measure may be provided by post-processing from the information stored in the aerial refueling coupling 1.

Additionally, according to another preferred embodiment, the aerial refueling coupling 1 comprises a Real Time Clock (RTC) 6 synchronized with the Universal Coordinated Time (UTC) and connected to the data processing device 4 for synchronizing the measures. This way, the aerial refueling coupling 1 is able to count with an organized collection of measures, which facilitates the post-processing of the recorded data. Also, enables recording and storing the video captured by the video camera 11 with real time information.

According to another preferred embodiment, the data processing device 4 is configured to measure the electrical pulses generated by the ram air turbine 12 when is in-flight, and to calculate the air speed from the measure.

In addition, according to another preferred embodiment, the power supply system 2 might comprise a battery 20 to store energy for supplying energy to the data processing device 2 and to the sensor and storage 5 systems. The battery 20 is suitable for withstanding flight conditions. An algorithm based on the RAT inputs allows managing the energy supply, saving energy when the drogue is not deployed.

According to another preferred embodiment, the data processing device 4 is configured to switch off all the systems: the sensor system, the storage system 5 and the data processing device itself by stopping feeding them from the power supply system 2 when the ram air turbine 12 stops generating electrical pulses. Thus, the aerial refueling coupling is a well-managed energy device, since the sensor system, the storage system 5 and the data processing device 4 are only powered when the aerial refueling coupling 1 is in-flight and the detecting and/or measuring can take place.

In another preferred embodiment, the power supply system 2 may comprise a relay 3, so that as soon as aerial refueling coupling 1 is deployed and the ram air turbine 12 starts turning, the ram air turbine 12 feeds the relay 3, which switch on whole system (the data processing device, the sensor system and the storage system 5), fed by the power supply system 2.

According to another preferred embodiment, the storage system 5 is a removable memory card. Thereby, the disclosure herein enables a post-processing of the data stored in the storage system 5 during the whole in-flight refueling process operation.

Figure 3:
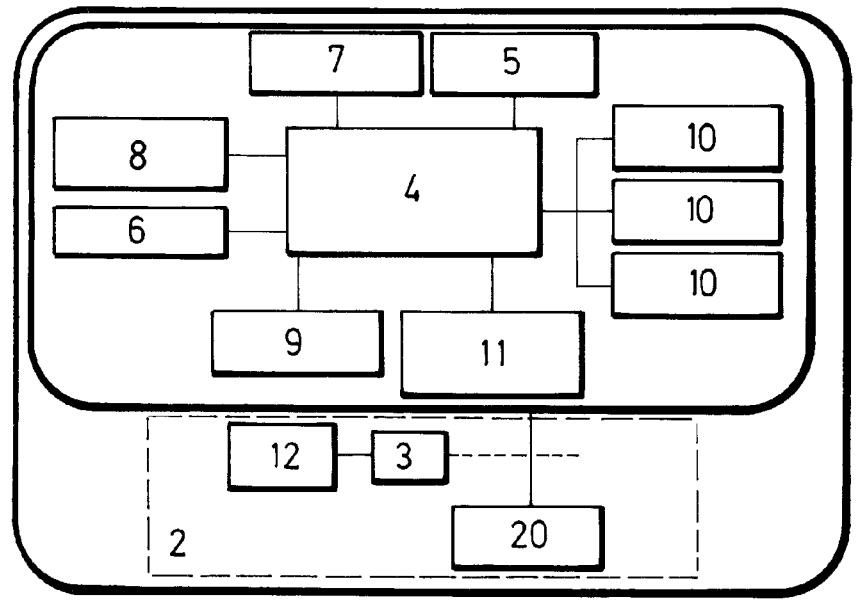
FIG. 3 shows a simplified block diagram illustrating most of the elements that form the sensor system, the data processing device, the storage system and the power supply system, according to an embodiment of the disclosure herein.

FIG. 3 shows a simplified block diagram illustrating the architecture of the preferential elements that form the sensor system, the data processing device 4, the storage system 5, and the power supply system 2.

Preferentially, all the hardware formed by the elements that constitute the sensor system, the data processing device 4, the storage system 5 and the power supply system 2 are packaged within boxes in order to support the environmental qualification tests applicable for these applications. Likewise, enclosing the mentioned elements in boxes, the disclosure herein provides a more compact and robust solution, which in addition, facilitates their mounting.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aerial refueling coupling for in-flight parameter measuring, the aerial refueling coupling comprising:
    a body configured to receive and support a probe;
    a removable shell that covers at least part of the body;
    three latching pistons, at least one of which comprises a port for ground testing;
    a sensor system configured for detecting at least one parameter related to an in-flight refueling operation, the sensor system comprising a pressure sensor positioned on the port to detect fuel output pressure during the in-flight refueling operation;
    a data processing device configured to provide a measure relative to the at least one parameter detected by the sensor system;

a portable storage system in communication with the data processing device for storing measurements of the at least one parameter;

a power supply system comprising at least one battery, for supplying energy to the data processing device, the sensor system, and the portable storage system, and a ram air turbine for activation thereof when the aerial refueling coupling is in-flight, wherein the data processing device, the portable storage system, and the power supply system are mounted onto the body covered by the shell.

2. The aerial refueling coupling according to claim 1, comprising three latch levers configured to engage a probe, wherein the sensor system comprises at least one potentiometer positioned at each latch lever so as to detect a displacement of each of the latch levers.

3. The aerial refueling coupling according to claim 1, comprising a ball joint to allow rotatable movement of the aerial refueling coupling when the aerial refueling coupling is coupled to a probe for the in-flight refueling operation, wherein the sensor system comprises gauged screws that fix the ball joint to detect axial force exerted by or on the aerial refueling coupling during the in-flight refueling operation to compensate for a drag of the probe.

4. The aerial refueling coupling according to claim 1, wherein the pressure sensor is configured for detecting fuel pressure surges.

5. The aerial refueling coupling according to claim 1, wherein the sensor system comprises three-dimensional (3D) accelerometers and gyroscopes for detecting acceleration and positioning of the aerial refueling coupling.

6. The aerial refueling coupling according to claim 1, further comprising a video camera positioned at an outwards end of the aerial refueling coupling to record the in-flight refueling, the camera being in communication with the portable storage system to store a recording recorded by the video camera.

7. The aerial refueling coupling according to claim 6, wherein the data processing device is configured to provide a measure relative to an approach speed of a probe before entry of the probe into the aerial refueling coupling for the in-flight refueling operation.

8. The aerial refueling coupling according to claim 1, comprising a real time clock, which is synchronized with Coordinated Universal Time (UTC) and connected to the data processing device for synchronizing measures of the at least one parameter.

9. The aerial refueling coupling according to claim 1, wherein the data processing device is configured to measure electrical pulses generated by the ram air turbine when the aerial refueling coupling is in-flight and to calculate an air speed from the electrical pulses measured.

10. The aerial refueling coupling according to claim 1, wherein the power supply system comprises a battery configured to store energy and to supply energy to the data processing device, the sensor system, and the portable storage system, the battery being configured to withstand in-flight conditions.

11. The aerial refueling coupling according to claim 1, wherein the data processing device is configured to stop providing an energy to the sensor system, the portable storage system, and the data processing device itself from the power supply system when the ram air turbine stops generating sufficient electrical pulses.

12. The aerial refueling coupling according to claim 1, wherein the portable storage system is a removable memory card.

* * * * *